US011853469B2

(12) United States Patent
Wieczorek et al.

(10) Patent No.: US 11,853,469 B2
(45) Date of Patent: Dec. 26, 2023

(54) OPTIMIZE POWER CONSUMPTION OF DISPLAY AND PROJECTION DEVICES BY TRACING PASSENGER'S TRAJECTORY IN CAR CABIN (71) Applicant: SMR Patents S.à.r.l., Luxembourg (LU)

(72) Inventors: Romeo Wieczorek, Stuttgart (DE); Mukesh Patel, Stuttgart (DE); Thomas Agung-Nugraha, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 17/465,157

(22) Filed: Sep. 2, 2021

(65) Prior Publication Data

US 2021/0397247 A1  Dec. 23, 2021

Related U.S. Application Data (63) Continuation-in-part of application No. 16/623,830, filed as application No. PCT/EP2018/065796 on Jun. 14, 2018, now Pat. No. 11,112,873.

(30) Foreign Application Priority Data

Jun. 21, 2017  (DE) ........................ 10 2017 113 763

(51) Int. Cl.
*G06F 3/01* (2006.01)
*G06F 3/14* (2006.01)
*G06V 40/20* (2022.01)
(52) U.S. Cl.
CPC ................ *G06F 3/011* (2013.01); *G06F 3/14* (2013.01); *G06V 40/20* (2022.01)

(58) Field of Classification Search
None
See application file for complete search history.

(56) References Cited

U.S. PATENT DOCUMENTS 7,742,623 B1 * 6/2010 Moon .................... G06V 40/19
                                                    382/103
8,947,351 B1 * 2/2015 Noble ................ G06F 3/04883
                                                    345/156

(Continued)

FOREIGN PATENT DOCUMENTS

DE  102015122489 A1  6/2016

OTHER PUBLICATIONS

International Search Report dated Aug. 9, 2018 of International application No. PCT/EP2018/065796.

(Continued)

*Primary Examiner* — Matthew Yeung
(74) *Attorney, Agent, or Firm* — Jones Day (57) ABSTRACT A method of operating one or more output means for a motor vehicle that includes providing one or more sensors and the one or more output means, detecting an input based on at least one of a position and movement of a passenger body part using the one or more sensors, and controlling power consumption of the one or more output means based on the detected input where this detecting includes detecting one or more inputs, the one or more inputs comprising at least one of a proximity of the body part relative to the one or more output means and a trajectory of the body part relative to the one or more output means.

12 Claims, 5 Drawing Sheets

(56) References Cited

U.S. PATENT DOCUMENTS

| | | | |
|---|---|---|---|
| 9,864,430 B2* | 1/2018 | Wu | G06F 3/0304 |
| 10,496,163 B2* | 12/2019 | Siddiqui | G06V 40/20 |
| 2004/0240708 A1* | 12/2004 | Hu | G06T 7/73 |
| | | | 382/103 |
| 2008/0111833 A1* | 5/2008 | Thorn | G06F 1/3231 |
| | | | 345/690 |
| 2009/0196460 A1* | 8/2009 | Jakobs | G06V 40/19 |
| | | | 382/103 |
| 2012/0215403 A1* | 8/2012 | Tengler | B60K 35/00 |
| | | | 701/36 |
| 2013/0155237 A1* | 6/2013 | Paek | G06F 3/048 |
| | | | 348/148 |
| 2013/0207962 A1 | 8/2013 | Oberdorfer et al. | |
| 2014/0028548 A1* | 1/2014 | Bychkov | G06F 3/017 |
| | | | 345/156 |
| 2014/0129987 A1* | 5/2014 | Feit | G06F 3/04817 |
| | | | 715/835 |
| 2014/0361996 A1* | 12/2014 | Eden | G06F 3/013 |
| | | | 345/173 |
| 2016/0282937 A1* | 9/2016 | Thorn | G06T 7/75 |
| 2017/0090566 A1 | 3/2017 | George-Svahn et al. | |
| 2017/0213553 A1* | 7/2017 | Gunn | G06F 1/3234 |

OTHER PUBLICATIONS

Written Opinion dated Aug. 9, 2018 of International application No. PCT/EP2018/065796.

* cited by examiner

OPTIMIZE POWER CONSUMPTION OF DISPLAY AND PROJECTION DEVICES BY TRACING PASSENGER'S TRAJECTORY IN CAR CABIN

CROSS REFERENCE TO RELATED APPLICATIONS

This application is a continuation-in-part of U.S. patent application Ser. No. 16/623,830 filed Dec. 18, 2019, which is a National Stage Entry of International Patent Application No. PCT/EP2018/065796, filed Jun. 14, 2018, which claims the benefit of foreign priority to German Patent Application No. DE 10 2017 113 763.7, filed Jun. 21, 2017, each of which is hereby incorporated by reference in its entirety for all purposes

BACKGROUND

1. Field of the Invention

The present disclosure relates to a method for operating a display device, in particular for a motor vehicle, and a motor vehicle having a control apparatus which is designed to execute such a method.

2. Related Art

An increasing number of electronic (digital) display areas are being installed in modern motor vehicles, which are intended, on the one hand, to replace the traditional analog instrumentation of the motor vehicle and, on the other hand, can provide additional information such as, for example, map views, user interfaces for entertainment and telecommunication systems and the like.

It has been established that the operation of such display areas by traditional input units such as, for example, buttons, joysticks, touchpads or the like, is very complex and can therefore result, on the one hand, in inputting errors by the driver and, on the other hand, brings with it a high distraction risk for the driver.

For this reason, it is desirable to provide non-contact input methods which are as simple as possible. An operating device for a line of vision-dependent gesture control is thus known, for example, from U.S. 9,244,527 B2. The line of vision of the user thereby selects a target unit or a function which is to be affected by a following gesture input.

However, it has been established that pure gesture input can also result in incorrect operations in many cases. In particular, it can happen that random gestures, which are not in themselves intended to be operating inputs, are wrongly recognized as such so that the content of display areas is inadvertently altered by the driver of the motor vehicle. Gesture-based input systems frequently also require a multiplicity of different gestures which are often difficult for the user to remember. This can also result in inputting errors and in the user being distracted.

In addition, with the use of many displays or other projecting devices, there results a high level of power and fuel consumption. This issue is even more prominent for electric vehicles. Running several displays and projectors typically puts a lot of strain on the power system of the vehicle and results in low efficiency of the system. Typically, display or projected content in conventional vehicles are adapted for day and night modes using light sensors but this only assists in power consumption based on light conditions. Other conditions have also been monitored in conventional systems.

For example, US 2014/0104082 generally describes a power saving mode of a display in a vehicle, with a display controller switching the display screen to either a normal display or an economy display in accordance with a travel mode of the vehicle and a display content on the display screen. The economy display can have a reduce display range of the screen or a reduced illumination area of backlights.

Also, US 2015/0232030 describes a display unit which is electrically changeable from a non-display state to a display state in response to driver monitoring. If the gaze of the driver of the vehicle is at the display area for a threshold period of time, the display unit is changed from its non-display state to its display state. The driver monitoring may include an in-cabin camera having a field of view that encompasses the head of the driver of the equipped vehicle and an eye tracking system is also described.

In certain instances, however, completely turning off certain displays and projectors of the vehicle may have negative consequences and may be undesirable to a driver even when the driver's gaze is not detected by an eye tracking system.

SUMMARY

In an aspect, a method for operating a display device, in particular for a motor vehicle, which includes a plurality of display areas is therefore delivered, in which a first non-contact input operation of a user is detected and verified by a second non-contact input operation of the user in order to select at least one display element on a first display area; and at least one third non-contact input operation of the user is detected in order to displace the at least one selected display element at least once from the first display area within the first display area or to a second display area.

Thanks to the verification of the first non-contact input operation by the second non-contact input operation it can be ensured that inadvertent inputting errors by the user are reduced or completely avoided. Therefore, a particularly reliable method for operating a display device is created.

It is proposed that a multiplicity of non-contact input operations be provided, wherein the first, second and third non-contact input operations preferably differ from one another and/or can be selected and/or amended by the user.

It is preferable that the non-contact input operations are determined by a characteristic variable for the head of the user, in particular including a line of vision, an eye position, an iris position, a pupil position, a nose position, a posture of the head, a head position, a head orientation and/or a facial expression of the user, or a characteristic variable for the torso of the user, in particular including a bodily posture, a body position, a body orientation, a shoulder position and/or a shoulder orientation of the user, or a characteristic variable for a hand and/or at least one finger of the user, in particular including a gesture, such as a skimming past, approaching, moving away, splaying of fingers, bending of fingers, touching of fingers and/or making a fist and/or a finger and/or hand position and/or finger and/or hand orientation, or a characteristic variable for the mouth of the user, in particular including a movement of the lips, a noise and/or a voice command.

In order to detect the first non-contact input operation, at least one characteristic variable for the head of the user can be detected and, for verification purposes, at least one characteristic variable for the torso of the user can be detected as the second non-contact input operation, or vice versa. In order to detect the third non-contact input operation, at least one characteristic variable for the hand, the finger or fingers, and/or the mouth of the user can be detected.

A line of vision-dependent selection of the at least one display element on the first display area requires minimum activity on the part of the user and is consequently particularly convenient.

According to an example, the gesture control especially serves to perform a predetermined action, namely a displacement. This makes it possible to manage with a few, particularly simple gestures, which are easy to remember for the user. It is also possible to carry out a displacement via multiple display elements by means of multiple gestures, for example by repeated wiping movements of the hand.

The verification of the first input operation, preferably of the line of vision of the user, by the latter's body position or respectively body orientation as a second input operation can ensure that random eye movements (for example a quick sidelong glance at the front-seat passenger) are not already classified as an input operation. This improves the reliability of the operation of the display device.

In a further preferred embodiment, at least one depth image camera, in particular a time-of-flight camera, is used to detect the first and/or second and/or third non-contact input operation(s). In addition to brightness and/or color information, such depth image cameras also provide depth information for each pixel, that is to say a distance of the object assigned to the respective pixel from the camera. In the case of time-of-flight cameras, this is achieved by measuring the light propagation time between a light source, the object and the camera. Of course, other forms of depth image cameras such as, for example, stereoscopic cameras, interferometric cameras, triangulation systems or light field cameras can also be used. By including the depth or respectively distance information in the camera image to be evaluated, both gestures of the user and the latter's body and head position or respectively body and head orientation can be detected in a particularly reliable manner.

It is further preferred if monitors and/or projection screens and/or head-up displays and/or flexible OLED displays and/or liquid crystal displays and/or light-transmitting fabrics and/or light-transmitting films are used as display areas. As a result, the display device can be easily adapted to the internal design of a motor vehicle and can be seamlessly integrated therein. At the same time, it is thus possible to adapt individual display areas specifically to the requirements of a driver or occupant of the motor vehicle.

It is further preferred if display areas are used, which are arranged in an instrument panel and/or on a windshield and/or in a headliner and/or in a central console and/or in a further interior trim part of the motor vehicle. It can thus, for example, be ensured that for each possible line of vision or orientation of the driver, a display area is provided in the driver's field of view so that all of the necessary information can be transmitted to him at any time.

In a further preferred embodiment, the at least one display element is an icon and/or a menu item and/or a total content of the first display area and/or a selected subarea of the first display area. As a result, a multiplicity of different operating actions is made possible on the basis of the same operating method, without the user having to memorize specific gestures for this purpose. This facilitates the operation of the display device.

It is in addition preferred if the brain activity of the user and/or a voice input of the user is/are detected as a further non-contact input operation. This can both be used for a further verification of the operating actions already described, and can also serve to additionally modify the operating actions.

It is preferable that the at least one display element on the first display area is selected if the first and second non-contact input operations are detected within a first interval of time, and/or the at least one selected element is displaced from the first display area within the first display area or to a second display area if the first and/or second non-contact input operation(s) and the third non-contact input operation are detected within a second interval of time. This serves to further reduce incorrect operations.

It is furthermore proposed that the displacement can be cancelled by a fourth non-contact input operation of the user, which preferably differs from the first, second and third non-contact input operations of the user, or by actuating an input apparatus, in particular including a touch panel.

During the displacement of the at least one display element, the same can be enlarged and/or additional information regarding the at least one display element can be displayed and/or it is possible to change to a submenu regarding the at least one display element. As an alternative, during the displacement of the at least one display element, the same can be reduced and/or less information regarding the at least one display element can be displayed and/or the at least one display element can disappear from the line of vision of the user and/or enter the background. This makes it possible to browse or scroll between menu levels, even in a menu hierarchy. Navigation information can, for example, be displayed as a submenu at a selected point in the motor vehicle, via a main menu. Likewise, it is possible to push displays which are not required, for example regarding a telephone directory, during navigating into the background where it does not disturb the user.

Furthermore, a motor vehicle includes a display device with a plurality of display areas and a control apparatus which is configured to perform a method of the type described.

In an aspect of the invention, there is a method for operating one or more output means, in particular for a motor vehicle, which includes providing one or more sensors and one or more output means, detecting an input based on at least one of a position and movement of a passenger body part using the one or more sensors, and controlling power consumption of the one or more output means based on the detected input, where the detecting comprises detecting one or more inputs, the one or more inputs comprising at least one of a proximity of the body part relative to the one or more output means and a trajectory of the body part relative to the one or more output means.

It is preferable that the inputs from the method of operating one or more output means for a motor vehicle further comprise an eye trajectory of the passenger, a hand trajectory, or a gesture of the passenger.

It is also preferable that the one or more inputs from the method of operating one or more output means for a motor vehicle includes at least two inputs.

It is preferable that the one or more sensors comprise at least one of an infrared sensor, a time-of-flight sensor, an eye tracker, a camera, a 3D camera, a ranging device, or a stereo camera.

It is also preferable that the one or more output means comprise at least one of 1) a display or projector, 2) a display region and a projector region, 3) a plurality of displays or projectors, 4) a plurality of display regions, or 5) a plurality of projection regions.

According to an example of the invention of the method of operating one or more output means for a motor vehicle, the controlling of the power consumption comprises turning off or reducing power consumption of at least one of a plurality or displays, display regions, projectors or projection regions that are included in the one or more output means, and more preferably, the output means comprises at least one microphone for pure audio signals, the controlling the power consumption comprises turning on or enhancing power consumption of the at least one microphone, and the controlling of the power consumption comprises turning on or enhancing power consumption of the at least one microphone after turning off or reducing power consumption of the at least one display, display region, projector or projection region.

According to another example of the invention, controlling the power consumption of method of operating one or more output means for a motor vehicle is in response to detecting that the passenger is not looking at or not moving near the one or more output means or at least one region of the one or more output means.

Preferably, the controlling of the power consumption comprises at least one power consumption reducing step which includes at least one of reducing brightness of a backlight or reducing luminance of an entire area or region of the one or more displays or projectors, reducing sharpness and resolution of a displayed information on an entire area or region of one or more displays or projectors, at least one of pausing or freezing an image frame on an entire area or region of the one or more displays or projectors; or reducing a refresh rate of the one or more displays or projectors, and even more preferably, two of the power consumption reducing steps are applied simultaneously.

In another example, of the method of operating one or more output means for a motor vehicle, the one or more output means is adapted to provide at least one of an audio output and a video output.

In a further example of the method of operating one or more output means for a motor vehicle, the body part of the passenger comprises at least one of a head, a face, a mouth, an eye, a nose, a neck, a torso, a shoulder, an arm, a torso, a hand or a finger. Preferably, the detecting comprises detecting at least one of a head of the passenger including at least one of a line of vision, an eye position, an iris position, a pupil position, a nose position, a posture of the head, a head position, a head orientation, or a facial expression of the passenger; a torso of the passenger comprising at least one of a bodily posture, a body position, a body orientation, a shoulder position, or a shoulder orientation of the passenger, a hand or finger of the passenger comprising at least one of a bodily posture, a body position, a body orientation, a shoulder position, or a shoulder orientation of the passenger at least one of a gesture such as a skimming past, approaching, moving away, splaying of fingers, bending of fingers, touching of fingers, making a fist, a finger or hand position, or a finger or hand orientation, or a mouth of the passenger comprising at least one of a movement of the lips, a noise, or a voice command.

In a further example of the method of operating one or more output means for a motor vehicle, the one or more output means includes at least one of displays, monitors, projectors, projection screens, head-up displays, flexible OLED displays, liquid crystal displays, light-transmitting fabrics, or light-transmitting films.

Preferably, in the method of operating one or more output means for a motor vehicle, the one or more output means are arranged in at least one of an instrument panel, a windshield, a headliner, a central console, a ceiling, or in a further interior trim part of the motor vehicle.

BRIEF DESCRIPTION OF THE DRAWINGS

Preferred embodiments of the present invention are explained in greater detail below by way of example with reference to the drawings, in which.

DETAILED DESCRIPTION

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

Figure 1:
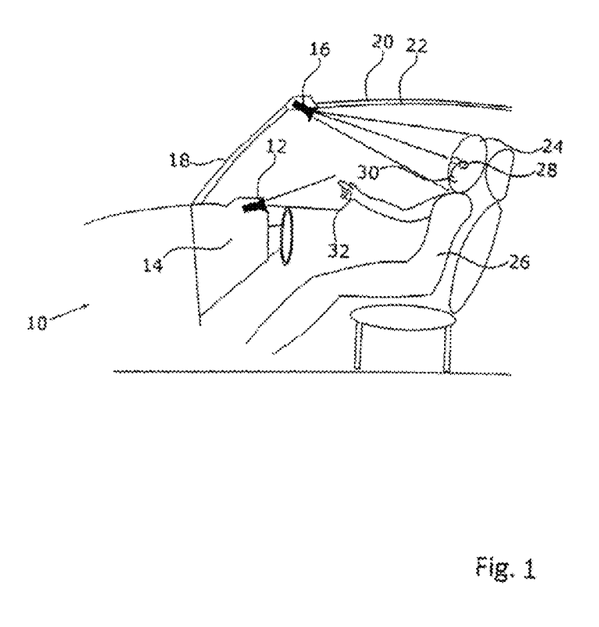
FIG. 1 shows a schematic representation of a motor vehicle which is configured to perform an exemplary embodiment of the method according to the invention.

A motor vehicle which is designated in its entirety with 10 includes a first camera 12 which is arranged in an instrument panel 14, and a second camera 16 which is installed at the transition between a windshield 18 and the roof 20 of the motor vehicle 10. The camera 16 can, for example, also be integrated into an internal rearview mirror of the motor vehicle 10.

Furthermore, the motor vehicle 10 includes a plurality of display devices (not represented in FIG. 1), which can be integrated, for example, into the instrument panel 14, can be executed as a head-up display on the windshield 18 or can be installed in a headliner 22 or other interior trim parts of the motor vehicle 10.

In order to make possible a non-contact control of the display devices, e.g. the position of a head 24 of a vehicle occupant 26, of the driver of the motor vehicle 10 in the example shown, is observed with the camera 16. The camera 16 detects, for example, both the eyes 28 of the vehicle occupant 26 and his entire head 24. The position of the eyes 28 can be monitored by image recognition of the eyes 28 as an entirety. However, a more precise analysis can also be performed, in which the position of the pupils or the iris of the eyes 28 is observed. In order to determine the position and orientation of the head 24, the camera 16 can observe parts of the head which are particularly easy to recognize such as, for example, the nose 30 of the vehicle occupant 26.

Furthermore, the further camera 12 in the instrument panel 24 records the position and movement of a hand 32 of the vehicle occupant 26.

The cameras 12, 16 are preferably depth image cameras, particularly preferably so-called time-of-flight cameras which also supply distance information for each pixel so that the image recognition becomes particularly precise.

Figure 2:
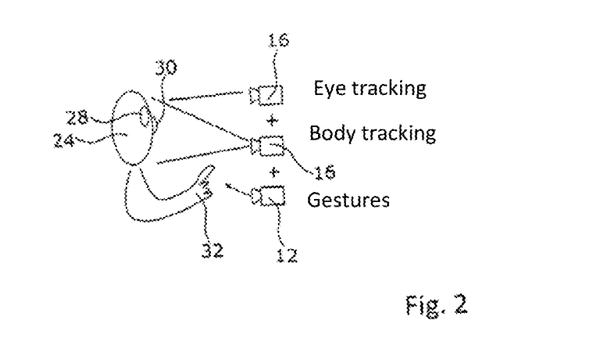
FIG. 2 represents a schematic representation of the detection of non-contact operating actions within the framework of an exemplary embodiment of the method according to the invention.

The combination of the detection of the head position, eye position and gestures of the vehicle occupant 26 makes possible, as explained below with reference to FIGS. 2 to 4, a particularly precise non-contact control of the display device of the motor vehicle 10.

FIG. 2 again summarizes how both gestures and the bodily and head posture or respectively the eye position of the vehicle occupant 26 are detected by means of three cameras 12 and 16. The detection of all of the indicated parameters is particularly advantageous for the described method.

Figure 3:
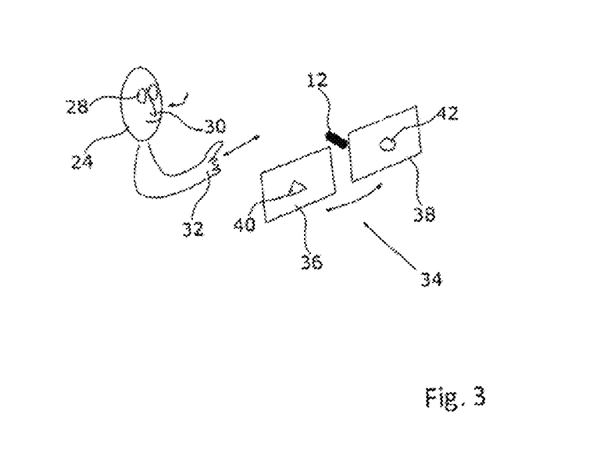
FIG. 3 represents a schematic representation of the performance of an operating action within the framework of an exemplary embodiment of the method according to the invention.
Figure 4:
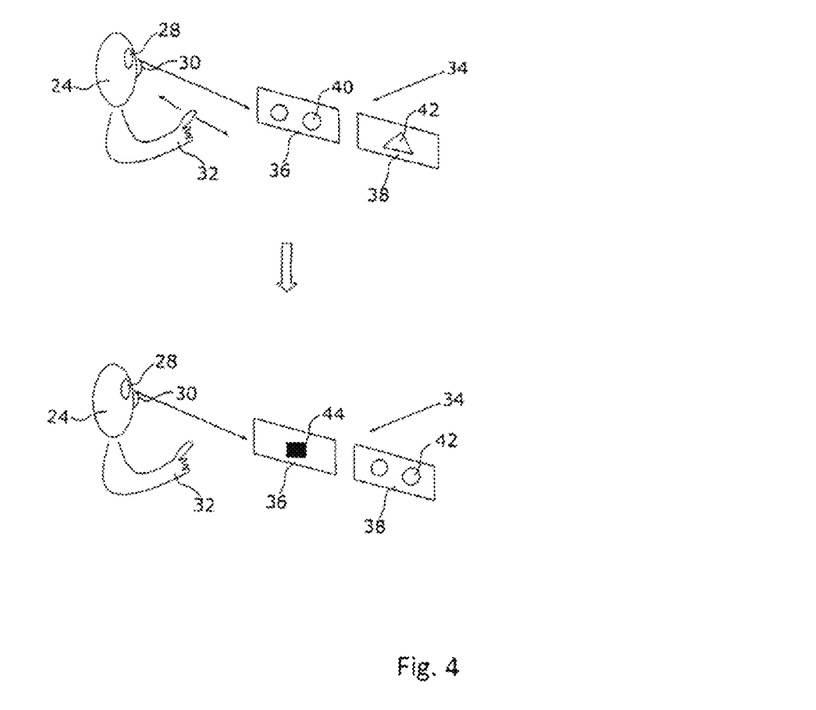
FIG. 4 shows a further schematic representation of the performance of an operating action within the framework of a further exemplary embodiment of the method according to the invention.

FIG. 3 shows how a display device 34 having a first display area 36 and a second display area 38 can be operated. A first display element 40, for example an icon, is arranged on the first display area 36. The second display area 38 shows a second display element 42, in which it can likewise be an icon, a menu item or the like.

If the vehicle occupant 26 then wishes to carry out an operating action, he will first look, for example, at one of the two display areas 36, 38, which is to be the objective of his operating action. He can thus, for example, look at the display area 36 and the line of vision is detected by means of his eye position with a first camera 16. At the same time, it is checked whether the bodily posture of the vehicle occupant 26 coincides with his line of vision in order to verify the recognition of the display area 36 to be selected. To this end, a second camera 16 detects the body orientation. If the vehicle occupant 26 then executes a gesture with his hand 32, which can be detected by the third camera 12, in the example shown a lateral wiping movement between the display areas 36, 38, the display element 40 selected by the look and verified by the body orientation is displaced from the selected display area 36 to the other display area 38.

FIG. 4 shows this again in detail. Here, the entire content of the display area 36 is displaced in the way described to the display area 38, as a result of which a new, predetermined display element 44 is displayed on the display area 36 which is now vacated. A displacement of the entire content of the display area 36 to the display area 38 is, however, not necessarily always the case. It is also possible that only one display element 40, 42, 44 is displaced between the display areas 36, 38 in the way described, or that further actions regarding the selected display element 40, 42, 44 are performed. For example, by displacing an individual icon to a new display area 36, 38, a program associated with said icon can be activated in the newly selected display area 36, 38, or similar further operating functions can be performed. Here, the selection of a menu item, the adjustment of slide controls such as, for example, for the volume of an entertainment system, the selection from a list such as, for example, a list of telephone numbers for an integrated telephone or the like is also conceivable.

To this end, further non-contact inputs can also be detected and evaluated. An additional voice recognition or the recognition of brain activities of the user within the meaning of a brain-machine interface is conceivable, for example.

Figure 5:
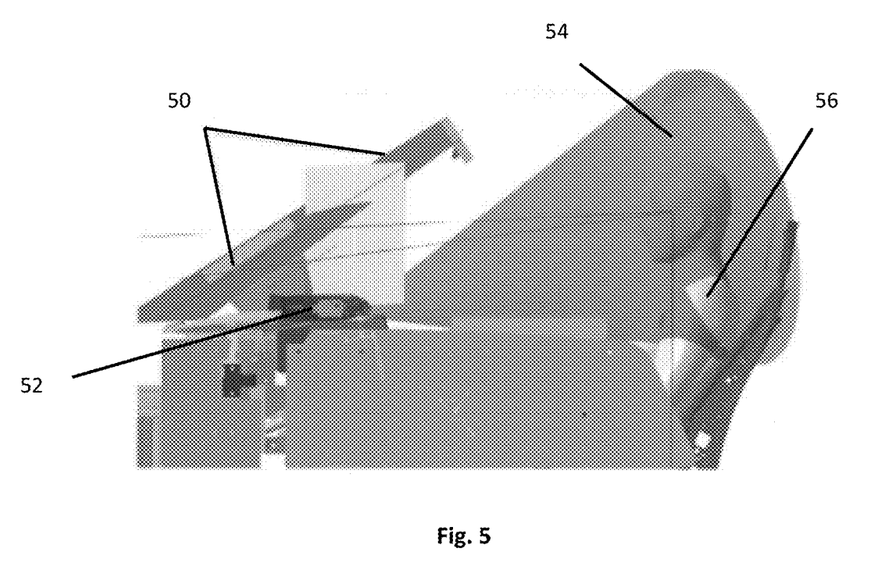
FIG. 5 is a diagram illustrating an example of an example arrangement of one or more sensors and projection or display devices which operate in response to one or more inputs detected of the one or more sensors.

FIG. 5 is a diagram illustrating an example of an example arrangement of one or more sensors 52 and projection or display devices 50 which operate in response to one or more inputs detected of the one or more sensors 52. Referring to FIG. 5, an example architecture and a method for a vehicle is adapted to display or project content depending on a trajectory of a person such as a driver or any passengers 56. The system may determine the trajectory of the passenger 56 within a tracking area 54 using one or more sensors 52 such as infrared, time-of-flight, eye trackers, cameras, 3D cameras, stereo cameras or one or more of same. Any one or a combination of these sensors 52 may be used to detect a direction, location, or position of where the passenger 56 is or where the passenger 56 is looking at any moment in time. Based on the detected information, the system may activate one or more display or projection devices 50, and the area or devices where the passenger 56 is not looking may be considered not useful or less useful.

In an example, the power consumption of the areas, devices, displays, or projection devices 50 could be reduced. Various ways of reducing power consumption may include one or more of: reducing brightness of a backlight of a display or reducing the luminance of a projector; reducing sharpness and resolution of a displayed information on a complete area of the display or projection; reducing sharpness and resolution of a displayed information on a partial area of the display or projection; pausing and/or freezing the image frame; and/or reducing the refresh rate of the display. The system may apply any power optimization method alone or in combination with another method to achieve the optimum power efficiency. As a result, not only is power use optimized but the lifetime of the display or projection device 50 is also increased.

In a preferred example, the one or more sensors 52 may detect more than one input; and in particular, may detect more than just the eye trajectory of a passenger 56. The one or more sensors 52 may also detect a gesture or other movement of the passenger 56 such as a facial gesture, a neck gesture, an arm gesture, a torso gesture, a finger gesture, or any other body-part gesture. The one or more sensors 52 may also detect how far away one or more body-parts of a passenger 56 are from one or more displays or projection devices 50. Based on these detected gestures or movements, the system may apply any one or more of the power optimization methods described above. Further, in a preferred example, the power savings of a device with at least two output means for providing information, such as an audio output means (including, for example microphones for pure audio signals, which require less power than video signals) as well as video output means (including, for example, one or more displays or projections), may be selectively controlled depending on their respective power consumption. That is, based on the detection by the one or more sensors 52, as described throughout this application, the audio output of a display or projection device may remain unaffected while the power consumption of the video output is optimized (such as by reducing brightness, luminance, or turning off the video output altogether). The opposite configuration is also possible—that is, the video output may remain unaffected while the power consumption of the audio output is optimized.

Figure 6:
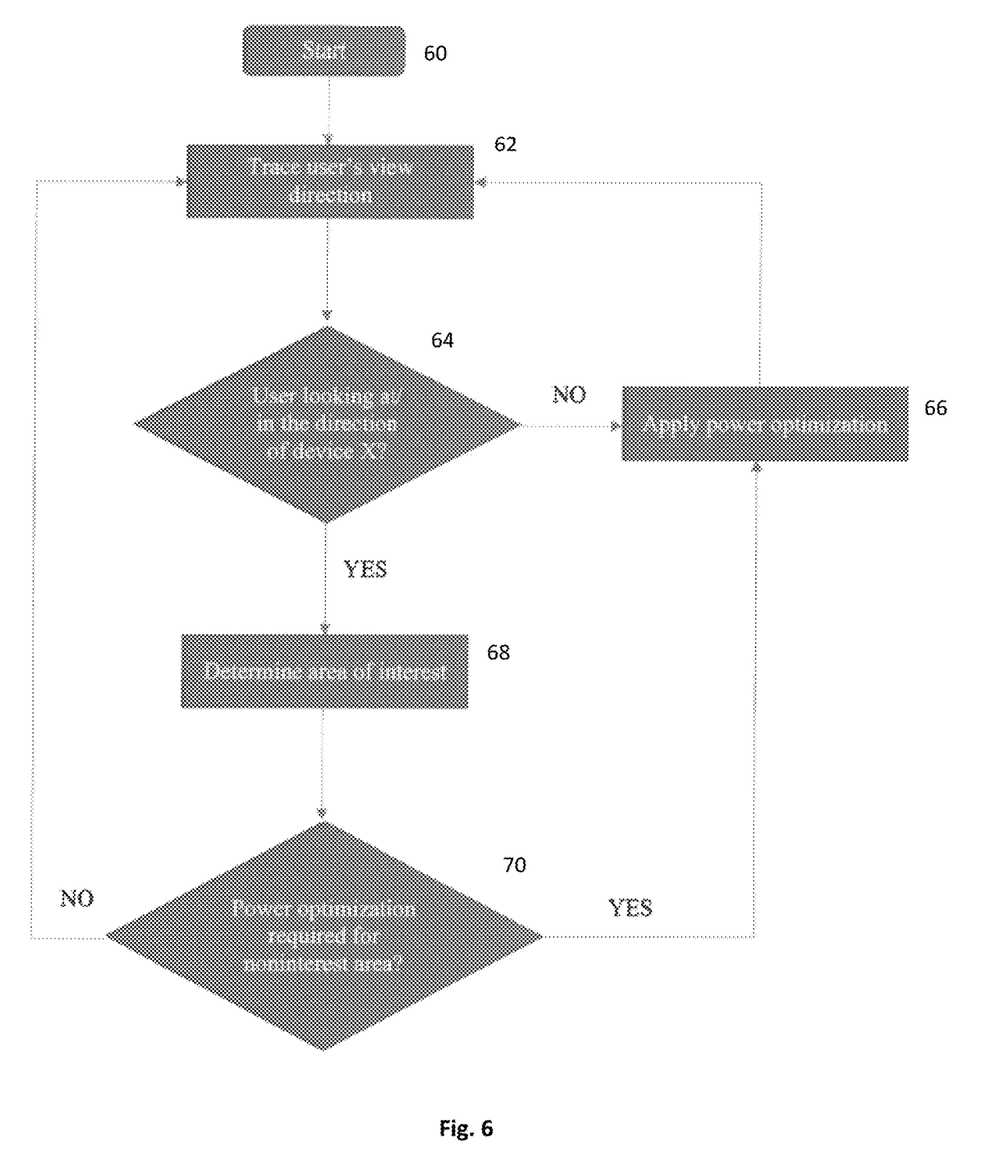
FIG. 6 is a flow diagram illustrating an example of determining power optimization for a display or projection device depending on detected inputs.

FIG. 6 is a flow diagram illustrating an example of determining power optimization for a display or projection device depending on detected inputs. Referring to FIG. 6, in step 60 a process for determining and/or executing power optimization is started. In step 62, a user's view direction, gesture, or movement as described above may be detected. In step 64, it is determined where the user is looking or where the gesture or movement is being applied. If the user is not looking at the display device (or a preset gesture or movement is detected), in step 66 power optimization may be applied. Otherwise, in step 68, the area where the user is looking (or where the preset gesture or movement is detected) is determined. In step 70, if power optimization is required for a partial section of the display or projection, then power optimization may be applied as in step 66. Otherwise, the system may loop back to step 62. The power optimization in step 66 may be the optimization of only one output for a device or system with at least two output means (such as audio and video) for providing information, as already described above.

The features of the invention disclosed in the above description, in the drawings and in the claims can be material, both individually and in any combination, for the realization of the invention in its various embodiments.

LIST OF REFERENCE NUMERALS

Motor vehicle 10
Camera 12
Instrument panel 14
Camera 16
Windshield 18
Roof 20
Headliner 22
Head 24
Vehicle occupant 26
Eye 28
Nose 30
Hand 32
Display device 34
Display area 36
Display area 38
Display element 40
Display element 42
Display element 44
Projection/display 50
Sensor(s) 52
Tracking area 54
Passenger 56
Steps 60, 62, 64, 66, 68, 70

What is claimed is:

1. A method of operating one or more output devices for a motor vehicle in a non-contact control, the method comprising:
   providing one or more sensors and the one or more output devices, the one or more output devices comprising at least one of a plurality of displays, display regions, projectors, or projection regions;
   detecting, using the one or more sensors, two or more inputs comprising:
      i) a first input comprising an eye trajectory of a passenger;
      ii) a second input comprising a proximity of a body part of the passenger relative to the one or more output devices and a trajectory of the body part relative to the one or more output devices,
      wherein the body part is a head of the passenger or a torso of the passenger, and
      wherein an intended field of view of the eye trajectory is verified based on the second input to prevent random eye movements from being classified as an input; and
      iii) a third input comprising an affirmative non-contact hand gesture of the passenger, the third input displacing, from the at least one of a plurality of displays, display regions, projectors, or projection regions, a display element within the intended field of view of the eye position; and
   controlling a power consumption of the one or more output devices based on the two or more inputs, controlling the power consumption comprising:
      turning off or reducing power consumption of the one or more output devices; and
      turning on or increasing power consumption of at least one audio output device after turning off or reducing power consumption of the one or more output devices.

2. The method of claim 1, wherein
   the one or more sensors comprise at least one of an infrared sensor, a time-of-flight sensor, an eye tracker, a camera, a 3D camera, a ranging device, or a stereo camera.

3. The method of claim 1, wherein the controlling of the power consumption is in response to detecting that the passenger is not looking at or not moving near the one or more output devices or at least one region of the one or more output devices.

4. The method of claim 1, wherein the controlling of the power consumption further comprises at least one power consumption reducing step which comprises at least one of:
   reducing brightness of a backlight or reducing luminance of an entire area or region of at least one of the one or more output devices;
   reducing sharpness and resolution of a displayed information on an entire area or region of at least one of the one or more output devices;
   at least one of pausing or freezing an image frame on an entire area or region of at least one of the one or more output devices; or
   reducing a refresh rate of at least one of the one or more output devices.

5. The method of claim 4, wherein at least two of the power consumption reducing steps are applied simultaneously.

6. The method of claim 1, wherein the one or more output devices is adapted to provide at least one of an audio output and a video output.

7. The method of claim 1, wherein the detecting the head of the passenger comprises, a posture of the head, a head position, a head orientation, or a facial expression of the passenger, and wherein detecting the torso of the passenger comprises at least one of a bodily posture, a body position, a body orientation, a shoulder position, or a shoulder orientation of the passenger.

8. The method of claim 1, wherein the one or more output devices further comprises at least one of displays, monitors, projectors, projection screens, head-up displays, flexible OLED displays, liquid crystal displays, light-transmitting fabrics, or light-transmitting films.

9. The method of claim 1, wherein the one or more output devices are arranged in at least one of an instrument panel, a windshield, a headliner, a central console, a ceiling, or in a further interior trim part of the motor vehicle.

10. A motor vehicle, comprising;
one or more sensors;
one or more output devices;
a controller comprising electrical circuitry configured to perform a method, comprising:
providing the one or more sensors and the one or more output devices, the one or more output devices comprising at least one of a plurality of displays, display regions, projectors, or projection regions;
detecting, using the one or more sensors, two or more inputs comprising:
i) a first input comprising an eye trajectory of a passenger;
ii) a second input comprising a proximity of a body part of the passenger relative to the one or more output devices and a trajectory of the body part relative to the one or more output devices, wherein the body part is a head of the passenger or a torso of the passenger, and wherein an intended field of view of the eye trajectory the first input is verified based on the second input to prevent random eye movements from being classified as an input; and
iii) a third input comprising an affirmative non-contact hand gesture of the passenger, the third input displacing, from the at least one of a plurality of displays, display regions, projectors, or projection regions, a display element within the intended field of view of the eye position;
controlling a power consumption of the one or more output devices based on the two or more inputs, controlling the power consumption comprising:
turning off or reducing power consumption of the one or more output devices; and
turning on or increasing power consumption of at least one audio output device after turning off or reducing power consumption of the one or more output devices.

11. The method of claim 1, wherein:
the turning off or reducing of the power consumption of the one or more output devices is based on the proximity of the body part relative to the one or more output devices and the turning on or increasing power consumption of at least one audio output device is based on the trajectory of the body part relative to the one or more output devices.

12. A method of controlling a power consumption of one or more output devices for a motor vehicle, the method comprising:
providing one or more sensors and the one or more output devices, the one or more output devices comprising at least one of a plurality of displays, display regions, projectors, or projection regions;
detecting, using the one or more sensors, two or more inputs of a passenger or a driver, the two or more inputs comprising:
i) a first input comprising an eye position of any one of the passenger or the driver; and
ii) a second input comprising an affirmative non-contact gesture and a proximity of a body part detected by the one or more sensors, wherein the body part is a hand of the passenger or a hand of the driver, and wherein an intended field of view of the eye position is verified based on the second input to prevent random eye movements from being classified as an input;
controlling a power consumption of the one or more output devices based on the two or more inputs, controlling the power consumption comprising:
turning off or reducing power consumption of the one or more output devices; and
turning on or increasing power consumption of at least one audio output device after turning off or reducing power consumption of the one or more output devices.

* * * * *